(No Model.)
A. L. CRALLE.
ICE CREAM MOLD AND DISHER.
No. 576,395. Patented Feb. 2, 1897.
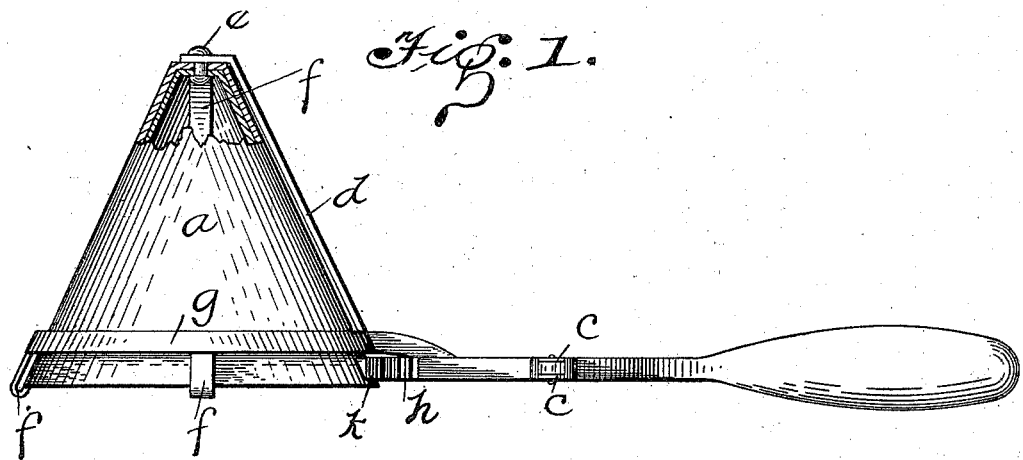
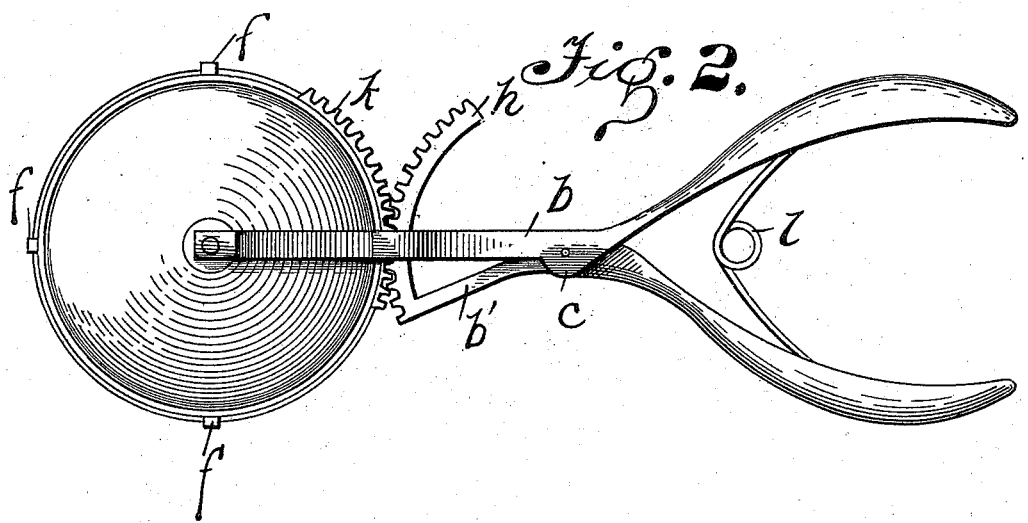

United States Patent Office.

ALFRED L. CRALLE, OF PITTSBURG, PENNSYLVANIA.

ICE-CREAM MOLD AND DISHER.

SPECIFICATION forming part of Letters Patent No. 576,395, dated February 2, 1897.

Application filed June 10, 1896. Serial No. 595,016. (No model.)

*To all whom it may concern:*

Be it known that I, ALFRED L. CRALLE, a citizen of the United States of America, residing at Pittsburg, in the county of Allegheny and State of Pennsylvania, have invented certain new and useful Improvements in Ice-Cream Molds and Dishers, of which the following is a specification, reference being had therein to the accompanying drawings.

This invention relates to certain new and useful improvements in ice-cream molds and dishers, and has for its object to construct a disher that may be conveniently operated with one hand.

The invention has for its further object to construct a disher of the above-described class that will be extremely simple in its construction, strong, durable, effectual in its operation, and comparatively inexpensive to manufacture; furthermore, a disher of this class that can be constructed in almost any desired shape mold and that will have no delicate parts to become broken or disarranged.

With the above and other objects in view the invention finally consists in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout both views, in which—

Figure 1 is a side elevation of my improved mold and disher, partly in section. Fig. 2 is a top plan view of the same.

In the drawings, $a$ represents the mold, which is shown in the drawings for the purpose of illustration as cone-shaped, though this mold may be of any desired shape. This mold $a$ is supported by a handle formed in two sections $b$ and $b'$, respectively, the section $b$ being formed with jaws $c\ c$, which engage the section $b$, the said sections being pivotally secured together at this point. The section $b$ of the handle is provided with an arm $d$, extending lengthwise with the mold and secured at the apex thereof to the shaft or rivet $e$, on which said mold $a$ is adapted to rotate, as hereinafter described. The cutters or blades $f\ f$ are secured to rivet $e$ and engage the inner face of the mold. These cutters or blades $f\ f$ are bent over the rim of the mold and secured to a band $g$, encircling the mold and secured to the arm $d$. The portion $b'$ of the handle is provided on its inner end with a segmental rack $h$, adapted to engage with a toothed rack $k$, secured on the mold near the mouth of the same, and the handles are provided with a spring $l$, secured between the portion of the same to retract the cutters after the handles have been forced together.

The operation of my improved mold and dipper will be readily apparent from the views of the same which I have shown in the drawings, but to illustrate the same more clearly I will describe it as follows: We will assume, therefore, for this purpose that all the parts have been secured in their respective positions and it is desired to use the disher. The operator grasps the handles and by forcing the two together causes the segmental rack $h$ to engage with the rack $k$ and rotate the mold $a$ within the band $g$ and around the cutters or blades $f$, which will loosen the cream or other substance on which it is being employed and allow the same to fall into the saucer or plate provided therefor.

By this construction of a disher only one hand will be required to operate the same, the spring $l$ retracting the cutters when the pressure on the handle is released.

It will be observed that various changes may be made in the details of construction without departing from the general spirit of my invention.

Having fully described my invention, what I claim as new, and desire to secure by Letters Patent, is—

1. In an ice-cream mold and disher, the combination of the mold, a rack thereon, and a handle, said handle formed in two portions pivotally secured together, cutters secured to an arm upon one portion of the handle, and a segmental rack upon the other portion of said handle engaging the rack on said mold, as and for the purpose described.

2. In an ice-cream mold and disher, the combination of the mold, a rack thereon, and a handle, said handle formed in two portions pivotally secured together, cutters secured to an arm upon one portion of the handle, and a segmental rack upon the other portion of the handle engaging the rack on the mold and a spring secured between the portions of the handle as and for the purpose described.

3. In an ice-cream mold and disher, the combination of the mold, a rack thereon, and a handle, said handle formed in two portions pivotally secured together, cutters pivotally secured in the apex of the mold, said cutters overlapping the rim of said mold and secured to a band encircling the mold, one of said portions of said handle secured to the band and to the cutters at the apex of the mold, a segmental rack secured to the other portion of the handle adapted to engage the rack on said mold and a spring secured between the portions of the handle as and for the purpose described.

4. In an ice-cream mold and disher, the mold, a rack thereon, cutters pivotally secured in the apex of said mold and to a band encircling the mold, a handle, said handle formed in two portions pivotally secured together, one of said portions secured to said band and to the cutters at the apex of said mold, a rack secured to the other portion adapted to engage the rack on said mold as and for the purpose described.

In testimony whereof I affix my signature in presence of two witnesses.

ALFRED L. CRALLE.

Witnesses:
   A. M. WILSON,
   H. E. SEIBERT.